United States Patent [19]
Ortiz

[11] 3,916,540
[45] Nov. 4, 1975

[54] HAND-ACTUATED SCREW OPERATED TRANSPLANTER

[76] Inventor: Frank Ortiz, 648 W. San Francisco St., Santa Fe, N. Mex. 87501

[22] Filed: Feb. 2, 1973

[21] Appl. No.: 296,323

[52] U.S. Cl. ................................ 37/2 R; 294/50.8
[51] Int. Cl.² .......................................... A01G 23/02
[58] Field of Search ............ 37/2 R; 47/37.4; 111/4; 294/49, 50.6, 50.7, 50.8, 50.9

[56] References Cited
UNITED STATES PATENTS

| | | | |
|---|---|---|---|
| 816,236 | 3/1906 | Kline | 47/37.4 UX |
| 1,236,880 | 8/1917 | Sargent | 294/50.8 |
| 2,230,498 | 2/1941 | Loos et al. | 294/50.8 |
| 2,549,476 | 4/1951 | Johnson | 37/2 R UX |
| 2,703,251 | 3/1955 | Green | 294/50.8 |

*Primary Examiner*—Edgar S. Burr
*Assistant Examiner*—R. E. Suter

[57] ABSTRACT

The invention relates to a hand - operated rootcutter and tree baller especially for conifers, whereby the tree, tap root and earth ball immediately around the tree roots are cleanly severed from the surrounding earth by hand-actuated screw-operated blades.

1 Claim, 4 Drawing Figures

HAND-ACTUATED SCREW OPERATED TRANSPLANTER

BACKGROUND OF THE INVENTION

Most people engaged in the tree-selling business prefer to transplant the trees, i.e., perform the root-balling operation, entirely by hand, which is both time consuming and difficult, since the tap root of most conifers is located at the very center of the tree, making it difficult to cleanly sever it. Additionally, when the root is cut by hand the usually resultant jarring of the surrounding root ball can cause it to break up and prevent the removal of the tree altogether. Power driven tree-balling apparatus is available, however, most nurserymen still prefer to carry out the operation by hand since such equipment is heavy, cumbersome, expensive and is generally unnecessary for the removal of small trees. Also, such equipment can become entangled in the roots, thus breaking up the root ball and ruining the tree. Furthermore, when hand-balling conifers in their natural environment, the native clay soils in some areas, particularly the Southwest, can cause difficulty.

SUMMARY OF THE INVENTION

It is therefore an object of my invention to provide a hand-operated root-cutter that will enable trees to be removed from the ground quickly and easily no matter what type of soil is involved.

Another object of my invention is to provide and hand-operated root-cutter and tree baller that will cause a minimum of disturbance to the balled soil around the roots of the tree being transplanted.

Yet another object of my invention is to provide a root-cutter with easily removable blades to facilitate the placement of the device about the tree to be transplanted. A still further object of my invention is to provide a root-cutter which cuts the tap root cleanly and quickly, thus avoiding any splintering of the tap root which increases the tree's chaces of suvival after transplanting.

Another object of my invention is to provide a root-cutter which, although hand operated, has sufficient power to easily penetrate the ground irrespective of the soil conditions.

These objects are accomplished, according to the invention by a simple, hand operated root-cutter comprising two pair of arms, each being hingedly connected at the top and thereof and each pair being removably, pivotally secured at its bottom end to one of two cooperating cutting blades. The blades, in their closed, overlapping position, form substantially a hemispheric shell. The arms and attached blades are moved together by screws extending between the arms of each pair. When the tap root and lowermost part of the earth ball are ready to be severed, at least one of the blades is removed from its associated arms and the pairs of arms are opened. The device is then placed about the tree to be transplanted, the blade reattached and the screws turned to force the blades together under the ground surface to sever the tap root.

DETAILED DESCRIPTION OF THE INVENTION

Figure 1:
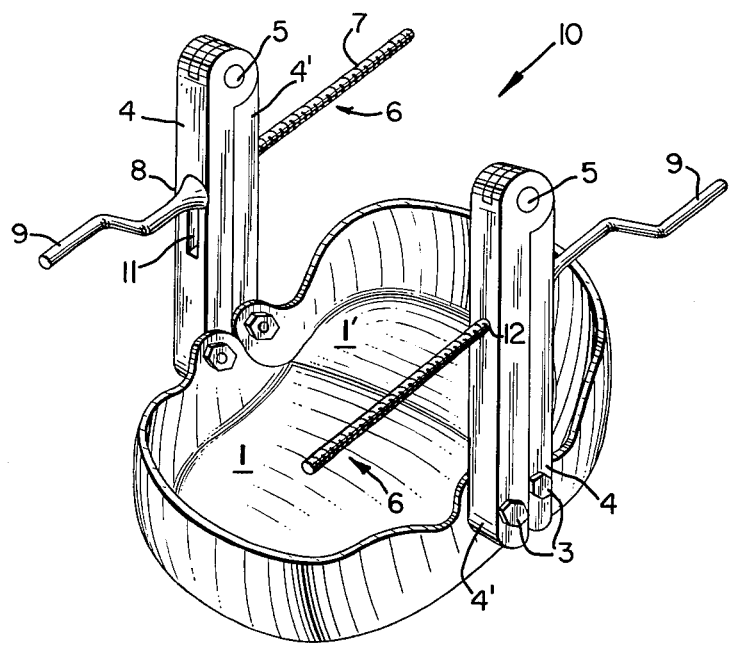
FIG. 1 is a perspective view of the root-cutter according to the invention.
Figure 2:
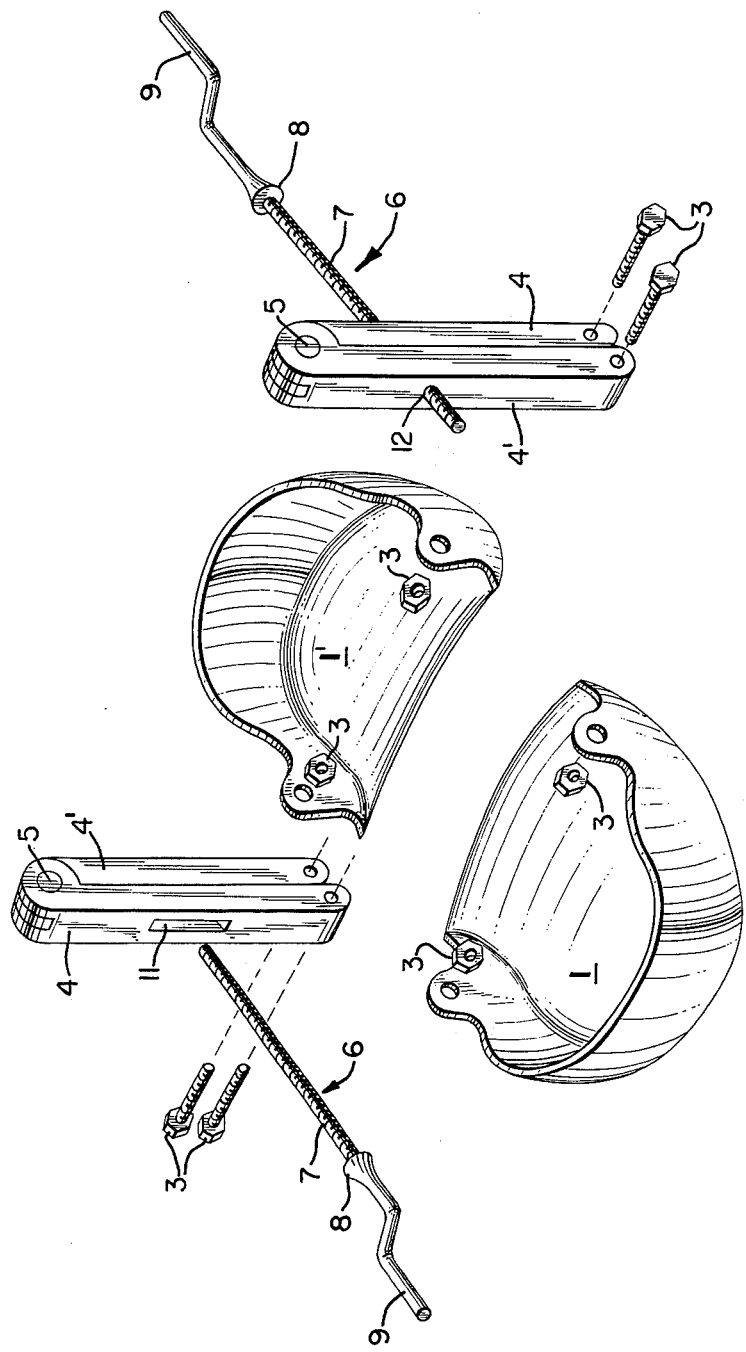
FIG. 2 is another perspective view of the device disassembled.
Figure 3:
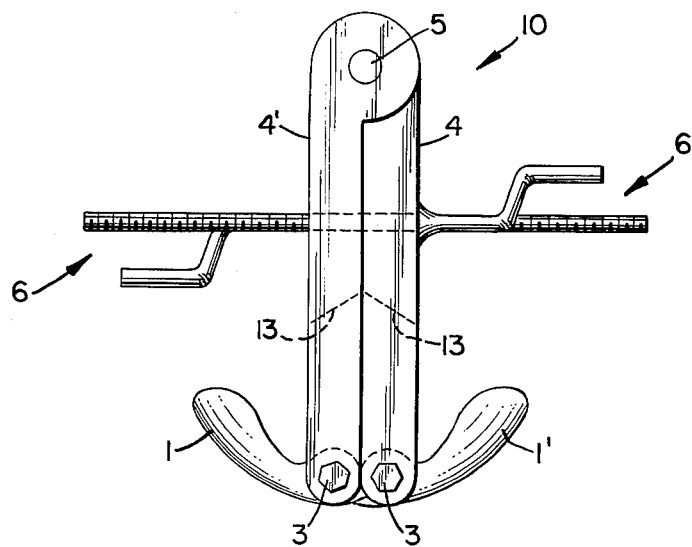
FIG. 3 is a side view of the device in the closed position.

Referring to the drawings, the root-cutter, generally designated 10 comprises two blades, 1,1' which, when in the closed position shown in FIGS. 1 and 3 overlap slightly at their respective cutting edges. The blades, 1,1' are removably, pivotally attached at opposite sides thereof, as by bold and nut assemblies 3, to the lower ends of arms 4,4'. One arm 4 and one arm 4' are located on each of two opposite sides of the blades 1,1' and are pivotally secured together at their upper ends by a hinge pin 5. The means to actuate the hinged arms 4,4' and their attached blades 1,1' comprises two screws 6, one for each set of hinged arms 4,4'. Each screw 6 has a threaded portion 7, a shoulder portion 8 and a handle portion 9. Each arm 4 has a slot 11 therethrough, which slot has an inclined bottom wall 13, while each arm 4' has a threaded bore 12 therethrough which engages threaded portion 7 of screw 6. Screw 6 can be inserted through slot 11 since the width of slot 11 is larger than the diameter of threaded portion 7. Portion 7 can then be threaded into bore 12. The width of slot 11 is however smaller than the diameter of shoulder portion 8, which allows the shoulder 8 to abut the edges of the slot 11 and apply pressure to arm 4 to force the arm 4 toward arm 4' thereby bringing the attached blades together.

Figure 4:
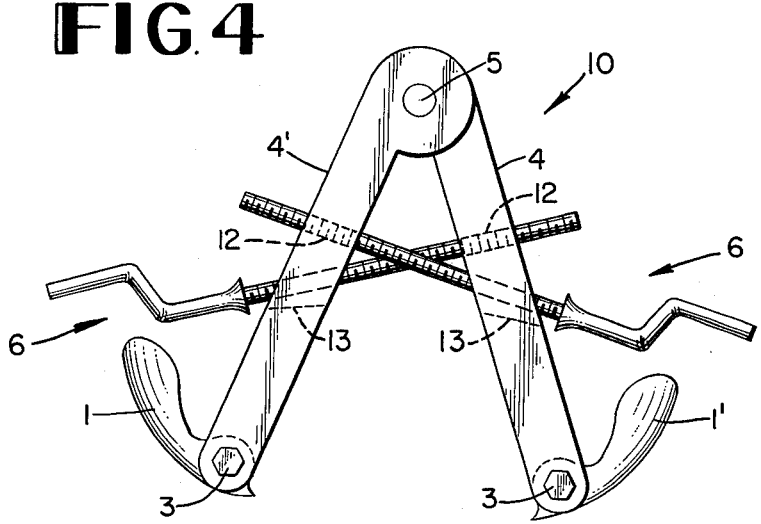
FIG. 4 is a side view of the device in the open position.

In operation, at least one of the blades 1,1' is removed from its associated arms 4,4' to permit the device to be placed around the tree to be transplanted. The screws 6 are backed off to allow the arms 4,4' to be moved to their open position. The slot 11 allows the threaded portion to move freely asthe arms are opened and the inclined bottom wall 13 of the slot 11 allow complete freedom of movement as shown in FIG. 4. The blade is then reattached to its respective arms and the cutting edges are inserted in the already started ball. The screws 6 are then turned and since the shoulder portion 8 is larger than the slot 11, it abuts thereagainst the forces the arms 4 toward the arms 4' about pivot pin 5. This in turn forces the attached blades 1,1' into the ground and toward one another until their cutting edges overlap, cleanly severing the tap root and earth ball from the surrounding soil

What I claim is:

1. A transplanter comprising two cooperating half-hemispherically shaped blades with opposed sharpened edges which extend substantially across the width of said blades are in a closed position to completely sever the roots of the tree being transplanted each said blade having apertures through said wall portion at opposite ends of said cutting edge;

two pairs of arms;
one of said pairs of arms removably attached to said blades at adjacent ends of said cutting edges;
each pair of arms being hingedly connected at one end thereof by a pivot pin defining a pivot axis and each arm of each pair of arms having a bore therethrough adjacent the other end thereof, attaching means cooperating with said apertures in said blades to provide said removable attachment;
one arm of each said pair of arms having a slot therethrough substantially midway between said ends of said arm and extending longitudinally between said ends, the other arm of each said pair having a threaded bore therethrough substantially aligned with said slot;

means to move the arms of each pair of arms between an open and a closed position, comprising a screw having a threaded portion, a shoulder portion and a handle portion;

the threaded portion of each screw having a diameter smaller than the width of each said slot is said one arm of each pair so as to pass freely therethrough and engage the threaded bore in said other arm of each pair;

the shoulder portion of each screw having a diameter larger than the width of each slot so as to abut there against as said screw is turned by said handle portion to thereby move said arms of each pair and their attached blades from said open to said closed position.

* * * * *